United States Patent
Schanz et al.

(10) Patent No.: US 9,333,655 B2
(45) Date of Patent: May 10, 2016

(54) HANDLING DEVICE WITH AT LEAST ONE CONTROLLABLY DEFORMABLE ELASTIC ELEMENT

(71) Applicant: FIPA GmbH, Ismaning (DE)

(72) Inventors: Henning Schanz, Gilching (DE); Roland Kob, Erding (DE)

(73) Assignee: FIPA GmbH, Ismaning (DE)

( * ) Notice: Subject to any disclaimer, the term of this patent is extended or adjusted under 35 U.S.C. 154(b) by 0 days.

(21) Appl. No.: 14/433,428

(22) PCT Filed: Oct. 2, 2013

(86) PCT No.: PCT/EP2013/070542
§ 371 (c)(1),
(2) Date: Apr. 3, 2015

(87) PCT Pub. No.: WO2014/053541
PCT Pub. Date: Apr. 10, 2014

(65) Prior Publication Data
US 2015/0258691 A1    Sep. 17, 2015

(30) Foreign Application Priority Data

Oct. 5, 2012  (DE) .......................... 10 2012 218 253
Apr. 3, 2013  (DE) .......................... 10 2013 005 525

(51) Int. Cl.
*B25J 15/00*      (2006.01)
*B25J 15/12*      (2006.01)
*B66C 1/54*       (2006.01)

(52) U.S. Cl.
CPC .............. *B25J 15/0047* (2013.01); *B25J 15/12* (2013.01); *B66C 1/54* (2013.01)

(58) Field of Classification Search
USPC .................... 294/93, 100, 192, 195, 183, 196
See application file for complete search history.

(56) References Cited

U.S. PATENT DOCUMENTS 3,134,620 A     5/1964   Blaisdell
3,777,875 A *  12/1973   Sobran .......................... 198/680
(Continued)

FOREIGN PATENT DOCUMENTS

DE          264881 A1      2/1989
DE      102009017683 B3    7/2010
FR         2392795 A1     12/1978

OTHER PUBLICATIONS

International Search Report, PCT/EP2013/070542, Jul. 1, 2014.
(Continued)

*Primary Examiner* — Paul T Chin
(74) *Attorney, Agent, or Firm* — Michael Best & Friedrich LLP

(57) ABSTRACT

A handling device (100) having at least one controllably deformable elastic element (10) is disclosed. With the objective of increasing handling precision and flexibility, the inventive solution provides for the controllably deformable elastic element (10) to be arranged in an active region (40) of the device and be designed to assume a normal position or at least one deformation position upon the appropriate control, wherein the position of a central region (15) of the elastic element (10) in the main direction of elongation (R), which extends substantially along the longitudinal axis (60) in the normal position and projects substantially transverse to the longitudinal axis (60) in the at least one deformation position, is definable by controlling the change in distance (A) from the longitudinal axis (60) within the active region (40).

20 Claims, 2 Drawing Sheets

(56) References Cited

U.S. PATENT DOCUMENTS

| | | | |
|---|---|---|---|
| 3,815,480 A * | 6/1974 | Spyra | 92/13.51 |
| 4,168,073 A * | 9/1979 | LaRue | 294/93 |
| 4,173,368 A * | 11/1979 | Haverbusch | 294/196 |
| 4,770,456 A | 9/1988 | Phillips et al. | |
| 5,201,875 A * | 4/1993 | Tessier et al. | 294/183 |
| 5,282,888 A * | 2/1994 | Fukawa et al. | 294/93 |
| 5,308,132 A * | 5/1994 | Kirby et al. | 294/185 |
| 5,322,300 A * | 6/1994 | Mistrater et al. | 294/93 |
| 7,452,017 B2 * | 11/2008 | Maffeis | 294/93 |
| 7,475,927 B2 * | 1/2009 | Maffeis | 294/93 |
| 7,891,076 B2 * | 2/2011 | Schmitt | 269/48.1 |
| 2007/0241578 A1 | 10/2007 | Maffeis | |

OTHER PUBLICATIONS

International Preliminary Report on Patentability, PCT/EP2013/070542, Dec. 11, 2014.

Office Action, DE 10 2012 218 253.5, Mar. 13, 2015.

\* cited by examiner

HANDLING DEVICE WITH AT LEAST ONE CONTROLLABLY DEFORMABLE ELASTIC ELEMENT

CROSS REFERENCE TO RELATED APPLICATIONS

This application claims priority under 35 U.S.C. §119 to PCT Application Number PCT/EP2013/070542 filed Oct. 2, 2013 which claims priority to German patent documents DE102012218253.5 and DE20131005525.3, the entire contents of which are hereby incorporated by reference herein.

BACKGROUND

The invention relates to a handling device having at least one controllably deformable elastic element.

Handling devices of substantially cylindrical elongation are designed to be inserted into openings of hollow bodies such as, for example, bottles or the like and which make contact with the inner wall of the hollow body by the controlled deforming of an elastic element preferably arranged on the end of the handling device.

A similar handling device is thus known from the DE 10 2007 017 662 A1 patent specification, for example, which has a thrust piston able to be actuated by pressure being applied to a fluid chamber for controllably displacing a deformable elastomer element arranged on the end of the handling device, wherein by forming a bulge, the elastic element can then come into contact with, for example, the inner wall of a hollow body such as a bottle into which the handling device is inserted due to the change in distance from a center axis relative to the handling device's main cylindrical direction of elongation.

SUMMARY

Such conventional handling devices have the disadvantage of only allowing low precision adjusting of the position where this bulging of the elastic element occurs. When delicate objects such as, for example, semiconductor components or the like are to be moved, this thus often results in limiting the depth at which the handling device can be inserted into the respective cavity; at the same time, however, for stability reasons, the handling device must often heed to a certain minimum depth of insertion so as not to impair secure handling. The above-described conventional handling devices having at least one controllably deformable elastic element only allow a controllable bulging of the elastic element without being able to exert any influence on its relative position with respect to the handling device's direction of elongation.

It is thus a task of the present invention to further develop a handling device of the above-cited type so as to improve its handling properties and positionability.

This task is solved by a handling device having the features as described below.

In particular, the task solved by a handling device having at least one controllably deformable elastic element, wherein the device exhibits a main direction of elongation along one longitudinal axis and wherein the controllably deformable elastic element is arranged in an active region of the device and designed to alternatively assume a normal or at least one deformation position upon the appropriate control. The position of a central region of the elastic element in the main direction of elongation, which extends substantially along the longitudinal axis in the normal position and projects substantially transverse to the longitudinal axis in the at least one deformation position, is definable by controlling the central region change in distance from the longitudinal axis within the active region.

To be understood by the central region of the elastic element is hereby a finite region which, with respect to the main direction of elongation, thus also with respect to the handling device's longitudinal axis, extends in the area of a plane substantially perpendicularly crossed by the longitudinal axis and runs through the center of the elastic element in longitudinal section.

The position of the central region can also be defined by (for example orthogonal) projection onto the longitudinal axis when the distance of said central region from the longitudinal axis changes during the transition from the normal position into the deformation position, thus upon formation of the above-described bulge, wherein while a smaller change of the central region expansion is then projected onto the longitudinal axis when transitioning from the normal position into the deformation position, the center of said central region within the active region projected onto the longitudinal axis, however, is substantially definable.

The controllably definable positioning of the central region in the deformation position, thus the controllably definable positioning of the bulging of the elastic element which is to come into contact with the inner wall of the hollow body to be handled, yields the particular advantage of hollow bodies to be moved such as, for example, housings for electronic semiconductor components or the like also being able to be moved in stable and secure manner when a minimum handling device insertion depth into the opening of the hollow body is desired for reasons of stability. The contact area between the elastic element's formed bulge in the deformation position and the inner wall of the hollow body to be moved is then essentially freely selectable within the active region.

Further, particularly in the case of automation technology, different hollow bodies having different height-related arranged contact areas are able to be held at the same handling device insertion depth just by varying the respective control of the elastic element within the bulge's optimal region of contact.

In other words, a robotic arm equipped with the disclosed handling device can for example also be always inserted into the differently configured hollow bodies to be moved at the same insertion depth in the normal position, whereby the subsequent control of the elastic element to bring it from the normal position into its at least one deformation position is then controlled as a function of where the contract area with the bulge is positioned. Doing so can in particular reduce the automation complexity and thus costs.

It is of course also possible for the handling device to not actively move a hollow body but rather secure it against inadvertent movement and fix it in one specific position.

Further developments according to the disclosed handling device are set forth below.

It is thus for example provided for the position of the central region in the main direction of elongation to remain substantially the same when controlling the distance change from the longitudinal axis.

In other words, it can also be provided for the position of the central region in the main direction of elongation to not change upon the bulging; i.e. upon the transition from the normal position into the at least one deformation position. A transverse axis running perpendicular to the longitudinal axis through the center of the central region thus does not displace accordingly relative to a fixation point or fixation region of the handling device when the elastic element is controllably changed from its normal position into the at least one deformation position.

The bulge is thus prevented from "drifting" along the longitudinal axis relative to a fixation region of the handling device during the transition from the normal position into the at least one deformation position, which may be advantageous when the desired contact region for the forming bulge with the inner wall of the hollow body to be moved is subject to spatial limitation and it is desirable to remain within same due for example to the material-related sensitivity of the hollow body to be moved.

It can furthermore be provided for the at least one deformation position to comprise a plurality of preferably continuously merging degrees of deformation able to be defined by the corresponding control.

The contact pressure of the elastic element's bulging is thereby flexibly variable without forgoing the action of the controllably definable position of the bulging in the active region. Components or the like of different mass, which necessitate different contact pressures, can thus be securely fixed or moved while simultaneously taking for example the maximum contact pressures or the like dictated by the cavity wall thicknesses into account.

It can further be provided for the respective elastic element end to at least partially abut against a respective device limit stop which is movable along the longitudinal axis and for the device to be designed to displace the limit stops within the active region to control the elastic element.

Such a structure to the disclosed handling device enables a particularly simple and effective manipulating of the elastic element for controllable deforming.

According to a further aspect of the invention, it is provided for the device to have an operative tensile connection to one limit stop and a thrust means operatively connected to the other limit stop for displacing said limit stops. The traction means is thereby selectively movable by hydraulic or pneumatic application of pressure on a first fluid chamber of the device; correspondingly the thrust means in some aspects cannot be selectively moved by hydraulic or pneumatic application of pressure on a second fluid chamber of the device, and namely done so in each case by means of varying the respective pressure.

It is hereby to be noted that it is possible to configure the two fluid chambers so as to be independently controllable; i.e. independently apply selectable pressures in order to be able to freely select the positions of the limit stops within the active region and thus also the position of the bulge within the active region essentially simultaneously to the controlled varying of the contact pressure.

It is of course not only possible to vary the respective pressure in just one direction; i.e. for example an increase in pressure, rather it is also provided for the fluid introduced into the first and/or second chamber to be able to be controllably evacuated again so as to thereby enable a reverse movement.

According to a further aspect of the invention, it is provided for the first and the second fluid chamber to be in pressure-based connection. The first and the second fluid chamber can also be formed by a single chamber, whereby in this case, the pulling motion via the traction means and the pushing motion via the pressure means are of course no longer independently controllable. This simplified structure nevertheless yields savings in terms of cost and effort.

In the case of a generally symmetrically designed elastic element, when the elastic element is actuated; i.e. the elastic element changed from its normal position into the at least one deformation position, the position of the central region in the main direction of elongation, thus the position of the bulge, essentially remains the same while the distance from the longitudinal axis changes; i.e. the central position of the bulge does not substantially change even under the progressively increasing pressure of the pressurized fluid chamber. This thus makes possible an essentially continuous change in the contact pressure of the bulge on the inner wall of the hollow body into which the handling device is inserted without there being any appreciable displacement of the contact region between the bulge and the inner wall.

It can furthermore be provided for the at least one elastic element to be arranged decentralized with respect to the longitudinal axis and preferably on the end of the handling device. Doing so yields a space-saving design to the handling device.

It can furthermore be provided for the at least one elastic element to be of substantially tubular or annular structure and at least partly formed from an elastomer, preferably rubber, polyurethane or silicone.

The cited materials exhibit particularly high contact capability with concurrent longer life span and lower rate of wear.

It can furthermore be provided for the device to be of substantially symmetrical structure with respect to the longitudinal axis. Such a structure approximating the ideal cylindrical form enables the positioning of the inventive handling device independently of rotation about the longitudinal axis in relation to the position of the hollow body to be fixed or moved.

BRIEF DESCRIPTION OF THE DRAWINGS

The following will reference a drawing in describing an embodiment of the disclosed handling device in greater detail.

Shown are.

DETAILED DESCRIPTION

Figure 1A:
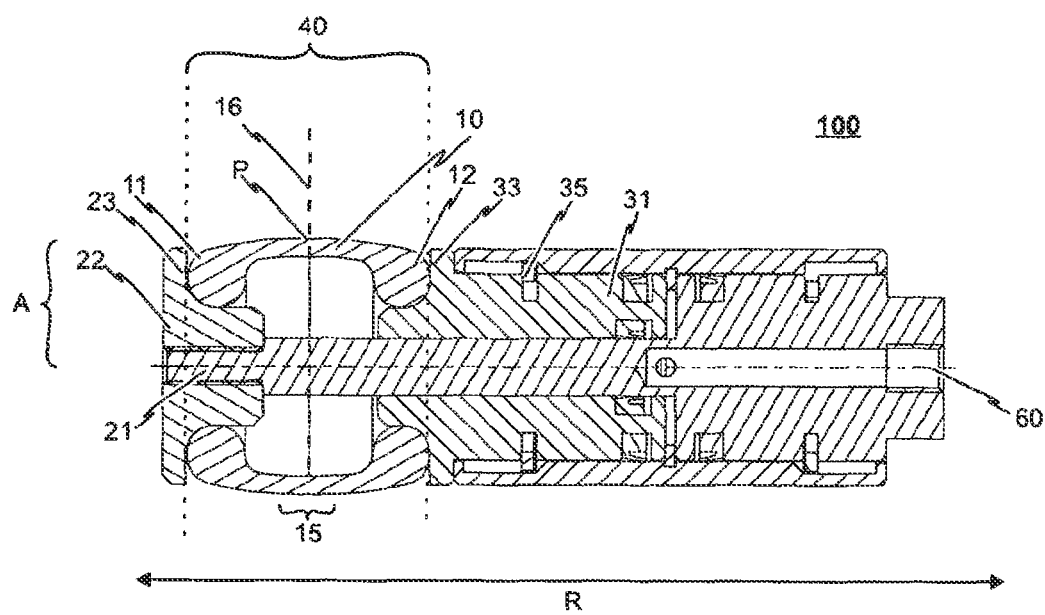
FIG. 1a a handling device having an elastic element at one end depicted in the normal position according to one embodiment of the invention.
Figure 1B:
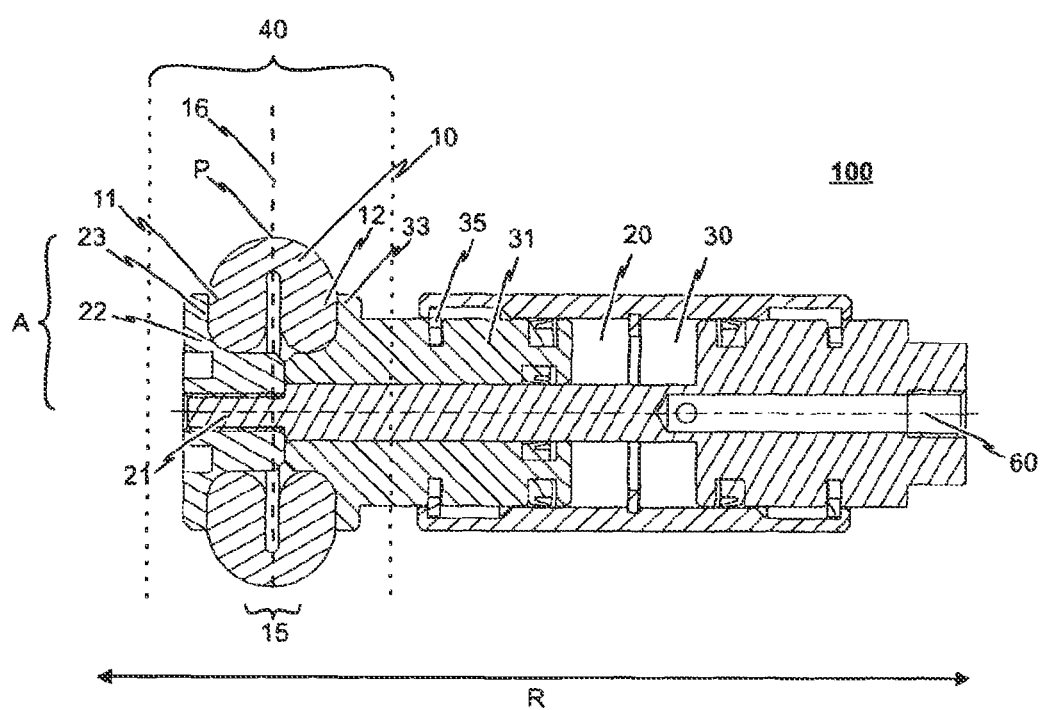
FIG. 1b the handling device according to the embodiment of FIG. 1a with the elastic element in a deformation position.

FIGS. 1a and 1b show a schematic sectional view of a handling device 100 according to a first embodiment, whereby FIG. 1a shows an elastic element 10 arranged on the end of the handling device 100 in its normal position; FIG. 1b correspondingly depicts the elastic element 10 in a deformation position as a bulge formation.

The handling device 100 according to the depicted embodiment comprises a first fluid chamber 20 and a second fluid chamber 30 within a piston, each respectively subjectable to pneumatic or hydraulic pressurizing. The handling device 100 is substantially symmetrically formed about a longitudinal axis 60 which extends in a main direction of elongation R of the handling device 100. In the normal position depicted in FIG. 1a, the outer peripheral surface of the handling device 100 accordingly approximates a cylindrical form.

The elastic element 10 exhibits a substantially tubular structure with reinforced ends and a relatively thinner central region joining the ends in relation to the main direction of elongation R and is formed from a suitable elastomer such as, for example, rubber. A first contact region 11 at the outer end of the elastic element 10 abuts against a first limit stop 23 of the handling device 100; correspondingly, a second contact region 12 abuts against a second limit stop 33 of the handling device 100.

In relation to a relative reference point of the wall of the handling device 100 adjoining the fluid chamber, the limit stops 23, 33 disposed within a constant active region 40 are designed to displace toward a central region 15 of the elastic element 10, wherein during such displacement, the elastic element 10 transitions from its normal position as depicted in FIG. 1a into a deformation position as depicted in FIG. 1b and forms a bulge due to the increasing distance A of the central region 15 from the longitudinal axis 60 able to, for example, move up against an inner wall of a hollow body (not shown in FIGS. 1a and 1b).

The first limit stop 23 is thereby formed on an end-side disk 22, whereby the end-side disk 22 is itself operatively connected to a tension rod 21 such that pressurizing the second fluid chamber 30 exerts a force to move the first limit stop 23 toward the central region 15 of the elastic element 10. The second limit stop 33 is correspondingly formed on a thrust piston 31 which likewise exerts a force on the central region 15 of the elastic element 10 by pressurizing the first fluid chamber 20 from the opposite side.

In so doing, it is possible to position the bulging of the elastic element 10 virtually at will within the active region 40 by the controlling of the fluid chambers 20, 30. At the same time, varying the pressures within the first fluid chamber 20 and the second fluid chamber 30 varies the distance A of the central region from the longitudinal axis 60, respectively then changes the contact pressure of the formed bulge of the elastic element 10 against the inner wall of the hollow body when the handling device 100 is inserted into a hollow body.

In the embodiment depicted in FIGS. 1a and 1b, the common transverse axis 16 of the central region 15, which is perpendicular to the longitudinal axis 60, is not displaced during the transition from the original position into the deformation position (i.e. transitioning from that as depicted in FIG. 1a to that as depicted in FIG. 1b). The relative position P of the central region 15 within the active region 50 thus remains unchanged in the embodiment as depicted.

When the handling device 100 of the embodiment is inserted into a (not shown) hollow body or the like, the contact pressure of the elastic element 10 on a (likewise not shown) inner wall of the hollow body is therefore variable without any change to the relative position of the central region 15, thus the transverse axis 16 of the central region 15, thereby ensuring a constant and secure handling of the hollow body.

Modifications thereof will be familiar to one skilled in the art.

The invention claimed is:

1. A handling device (100) defining a main direction of elongation (R) along a longitudinal axis (60), the handling device (100) comprising:
   first and second limit stops (23, 33);
   a traction means (21, 22) operatively coupled to the first limit stop (23);
   a thrust means (31) operatively coupled to the second limit stop (33) for displacing the first and second limit stops (23, 33);
   first and second fluid chambers (20, 30);
   an active region (40); and
   at least one controllably deformable elastic element (10) arranged in the active region (40) and configured to alternatively assume a normal position or at least one deformation position,
   wherein the at least one controllably deformable elastic element (10) defines a central region (15) in the main direction of elongation (R), which extends substantially along the longitudinal axis (60) in the normal position, and projects substantially transverse to the longitudinal axis (60) in the at least one deformation position and forms a bulge in the at least one deformation position due to an increase in a distance (A) of the central region (15) from the longitudinal axis (60),
   wherein the at least one controllably deformable elastic element (10) is configured to be controlled by changing the distance (A) from the longitudinal axis (60) within the active region (40) such that the bulge of the elastic element (10) which forms is positionable within the active region (40),
   wherein the at least one controllably deformable elastic element (10) at least partially abuts against the first or second limit stop (23, 33) of the device (100) which is movable along the longitudinal axis, and wherein the device (100) is configured to displace the first and second limit stops (23, 33) within the active region (40) to control the at least one deformable elastic element (10),
   wherein the traction means (21, 22) is movable by hydraulic or pneumatic application of pressure on the second fluid chamber (30) of the device (100) and the thrust means (31) is movable by hydraulic or pneumatic application of pressure on the first fluid chamber (20) of the device (100), and
   wherein the traction means (21, 22) and the thrust means (31) are configured to be moved from pressurizing the first and second fluid chambers (20, 30) at independently selectable pressures.

2. The device according to claim 1, wherein a position (P) of the central region (15) in the main direction of elongation (R) remains the same when changing the distance (A) from the longitudinal axis (60).

3. The device according claim 2, wherein the at least one deformation position comprises a plurality of continuously merging degrees of deformation.

4. The device according to claim 2, wherein the first and the second fluid chambers (20, 30) are in a pressure-based connection.

5. The device according to claim 2, wherein the at least one elastic element (10) is arranged at an end of the device.

6. The device according to claim 2, wherein the at least one elastic element (10) is of substantially tubular or annular structure and at least partly formed from an elastomer.

7. The device according to claim 2, wherein the device is of substantially symmetrical structure with respect to the longitudinal axis (60).

8. The device according claim 1, wherein the at least one deformation position comprises a plurality of continuously merging degrees of deformation.

9. The device according to claim 8, wherein the first and the second fluid chambers (20, 30) are in a pressure-based connection.

10. The device according to claim 8, wherein the at least one elastic element (10) is arranged at an end of the device.

11. The device according to claim 8, wherein the at least one elastic element (10) is of substantially tubular or annular structure and at least partly formed from an elastomer.

12. The device according to claim 8, wherein the device is of substantially symmetrical structure with respect to the longitudinal axis (60).

13. The device according to claim 1, wherein the first and the second fluid chambers (20, 30) are in a pressure-based connection.

14. The device according to claim 13, wherein the at least one elastic element (10) is arranged at an end of the device and wherein the active region is an unvarying active region (40).

15. The device according to claim 13, wherein the at least one elastic element (10) is of substantially tubular or annular structure and at least partly formed from an elastomer.

16. The device according to claim 13 wherein the device is of substantially symmetrical structure with respect to the longitudinal axis (60).

17. The device according to claim 1, wherein the at least one elastic element (10) is arranged at an end of the device.

18. The device according to claim 17, wherein the at least one elastic element (10) is of substantially tubular or annular structure and at least partly formed from an elastomer.

19. The device according to claim 1, wherein the at least one elastic element (10) is of substantially tubular or annular structure and at least partly formed from an elastomer.

20. The device according to claim 1 wherein the device is of substantially symmetrical structure with respect to the longitudinal axis (60).

\* \* \* \* \*